Jan. 1, 1963 R. E. SCHORNSTHEIMER 3,070,841
METHOD AND APPARATUS FOR MAKING MAGNETICALLY
ANISOTROPIC ELONGATED MAGNETS
Filed Dec. 7, 1960

INVENTOR.
ROBERT E. SCHORNSTHEIMER
BY W. A. Shira, Jr.
ATTY.

3,070,841
METHOD AND APPARATUS FOR MAKING MAGNETICALLY ANISOTROPIC ELONGATED MAGNETS
Robert E. Schornstheimer, Marietta, Ohio, assignor to The B. F. Goodrich Company, New York, N.Y., a corporation of New York
Filed Dec. 7, 1960, Ser. No. 74,347
10 Claims. (Cl. 18—12)

This invention relates to a method and apparatus for making magnetically anisotropic magnets. More particularly, the invention relates to a method and apparatus for increasing the orientation into generally parallel relationship of magnetic particles united by a plastic elastomeric material so that the non-sintered magnets made therefrom have greater magnetic strength than magnets of similar material in which the magnetic particles have a random distribution.

Permanent magnets, which are transversely flexible, can now be readily made in any desired length and cross section by uniting finely-divided magnetic material with a plastic elastomeric material and shaping the composite material into the desired configuration by extrusion, rolling, pressing, or other known operations. An example of such a material is a composition comprising non-cubic crystalline particles of a polyoxide of iron and at least one of the metals barium, strontium and lead, with the particles united by an elastomer such as plasticized polyvinyl chloride, polyethylene, natural or synthetic rubber, or other suitable elastomers. In such a composition the elastomeric material serves to unite the magnetic particles into a coherent body without the need for sintering which is the expedient employed to retain the particles together in magnets of the hard or ceramic type.

The presence of the elastomer in the flexing type magnets, while permitting formation of the magnets to desired shape by conventional expedients well-known to those handling elastomeric material, has the disadvantage of reducing the magnetic strength of the resulting magnet below the value of a magnet of like size in which the magnetic particles are directly united. Hence, magnets of the flexible type have not been used for many purposes to which their flexibility and ease of shaping adapts them because of their comparatively low magnetic strength, which, in general, is less than a magnet of equal size formed without the elastomeric binder as, for example, by the sintering process.

It is, of course, known that magnetic strength is related to orientation of the magnetic particles and hence attempts have been made to increase the strength of flexibile magnets by increasing the orientation of the magnetic particles therein. Prior efforts to achieve such improved orientation have not, however, resulted in the production of a method or apparatus capable of significant increase in this characteristic at a rate suitable for commercial adaptation.

The principal object of this invention is, therefore, the provision of a method and apparatus for increasing the orientation into generally parallel relationship of generally plate-like magnetic particles united by a plastic elastomeric material as an incident to the production of magnets therefrom and in a manner which is susceptible of use in the manufacturing operations for continuous formation of such magnets.

A more specific object of the invention is to provide an improved method and apparatus for increasing the orientation of generally plate-like magnetic particles united by a plastic elastomeric material characterized by shaping the material into a generally rectangular cross section, one dimension of which is several times that of the other, and then reducing the greater dimension while simultaneously increasing the lesser dimension through the exertion of pressure transversely upon the material as it travels in the direction of its length thereby causing the magnetic particles to move into positions in which their plate-like surfaces are in generally parallel relationship and are oriented parallel with respect to the surfaces of the composite material having the greater transverse dimension with the orientation occurring as a part of the continuous process of manufacture of a permanent magnet.

A still more specific object of the invention is to provide an improved extrusion die for orienting into generally parallel relationship particles which are generally plate-like in shape and united by a plastic elastomeric material, which die is characterized by having a material passageway therethrough of substantially the same area in every transverse section and with the entrance and exit openings to the passageway of unequal major and minor transverse dimensions with the major dimension of the exit opening disposed at right angles relative to the major dimension of the entrance opening.

A further object of the invention is to provide an improved method for producing permanent magnets of finely-divided plate-like magnetic particles united by plastic elastomeric material by extruding the composite material through a die which initially forms the material into a substantially rectangular cross section and then progressively reduces the major cross-sectional dimension while increasing the minor dimension thereof until these dimensions are reversed when the material leaves the extruder after which the extruded material has the thickness further reduced by cooperating rolls with the material moving in a continuous path from the extruder through the rolls and through a means for effecting magnetization so that an elongated, flexible, oriented magnet is made in a continuous length.

Further objects and advantages of the invention will be apparent to those skilled in the art to which the invention pertains from the following specific description of the presently preferred embodiment of the method and apparatus described with reference to the accompanying drawing, forming a part of this application, and in which.

The method and apparatus of this invention may be employed with a variety of magnetic materials and with a number of different elastomeric substances for uniting those particles into a composite material. Without limitation thereto, one satisfactory type of magnetic particles are the non-cubic, generally hexagonal, platelets or plate-like crystals of barium ferrite which have an axis of anisotropy perpendicular to the thickness of the crystals with the size of the particles being in the order of .07 to 4 microns. This finely-divided magnetic material is united together by an elastomer which may be a natural or synthetic rubber, polyvinyl acetate, polyvinyl chloride, polyethylene, or other suitable substance. For simplicity, however, this invention will be described with reference to the use of plasticized polyvinyl chloride as the substance which unites the finely-divided magnetic particles with the magnetic particles representing 90% or less of the total weight of the composition. It is to be understood, however, that the invention is not limited to use of polyvinyl chloride as the binder nor to the quantity of magnetic particles present.

Figure 1:
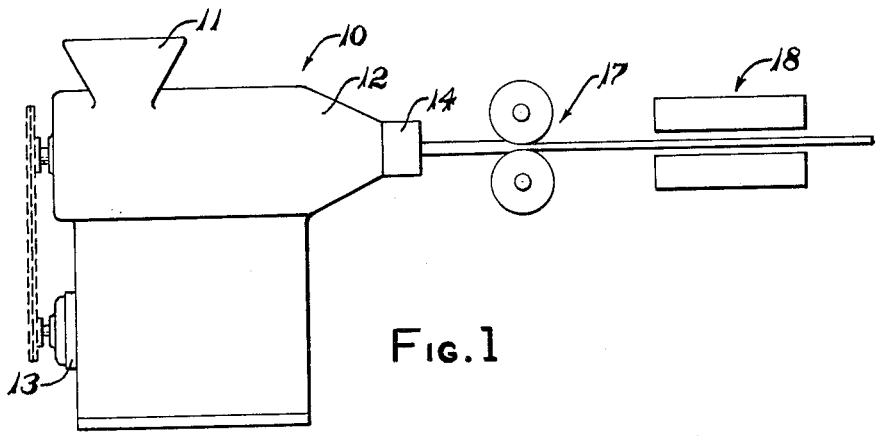
FIG. 1 is a somewhat schematic view, principally in side elevation, illustrating the presently preferred apparatus for performing the method of this invention.

In making flexible magnets from finely-divided barium ferrite and plasticized polyvinyl chloride, these materials are suitably mixed together by conventional means as, for example, by a mill of the type commonly utilized for compounding rubber and plastics, after which the material is fed into a conventional extruding apparatus, generally indicated 10 in FIG. 1. The details of this extrusion apparatus do not constitute a part of this invention and hence will not be described in detail. It is sufficient to note that such an apparatus conventionally comprises an inlet opening or hopper 11, into which the material to be extruded is placed, with the barrel 12 of the extruder containing a screw, not shown, driven by suitable power means 13 for forcing the material through a die 14.

In conventional extrusion operations, the shape of the die 14 is chosen to provide the extruded substance with the desired cross section. It has been found that when employing a conventional extrusion apparatus with an extrusion die of conventional type and having a generally rectangular opening, the resulting extruded strip of the magnetic particles in the elastomeric binder has only slight orientation of the particles, and hence the strength of the magnet is limited by the percentage of magnetic material which can be incorporated into the plastic substance without undesirably reducing the flexibility of the product and/or the cohesiveness thereof.

Theoretically, the extrusion process, when employed with finely-divided particles, held together by an elastomeric substance, should result in an appreciable tendency to orient the particles into a relationship in which the greatest dimention of the particles is generally parallel to the path of movement of the material through the extrusion die. This does not, however, result in sufficient orientation of plate-like particles to achieve the required improvement in magnetic properties. This may be due to the fact that, although the plate-like particles may all be oriented with their greatest dimensions extending in the direction of movement of the material, the planes of these plate-like particles are not parallel with the opposed faces of the extruded strip and hence the particles are not disposed so that the axes of easy magnetization thereof are in adjacent parallel relationship.

Figures 2, 3:
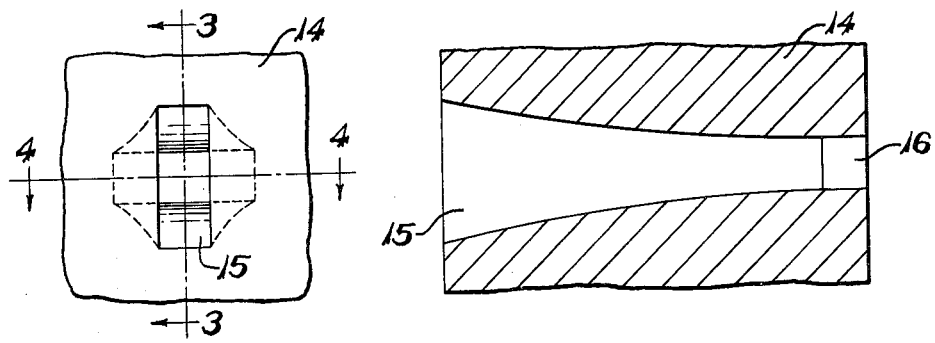
FIG. 2 is a detached, fragmentary, elevational view of an extrusion die embodying this invention and showing the entrance opening of the die.
FIG. 3 is a sectional view, taken substantially on the section indicating line 3—3 of FIG. 2, showing the material passageway through the die.
Figures 4, 5:
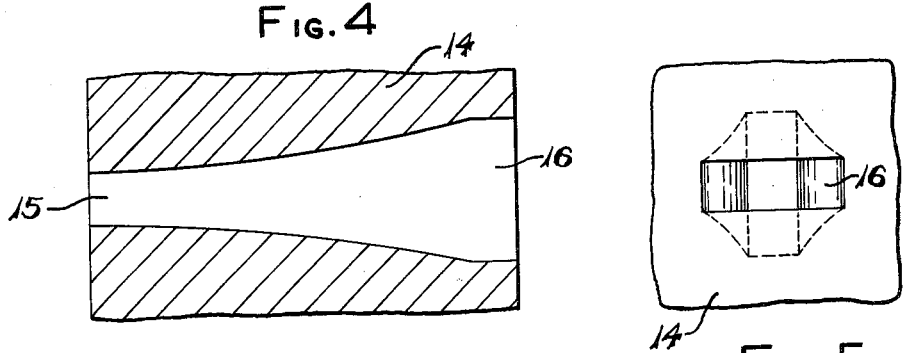
FIG. 4 is a sectional view, taken substantially on the section indicating line 4—4 of FIG. 2, showing the material passageway through the die.
FIG. 5 is a detached fragmentary view in elevation showing the exit opening from the die of FIGS. 2–4.

In accordance with this invention, the desired orientation of the magnetic particles is achieved to a much higher degree than has heretofore been possible by forming the extrusion die 14 so that, as the material moves therethrough the plate-like particles are caused to sequentially take up positions in which their greatest dimensions are in general alignment with the path of movement of the material and their faces are disposed parallel with the upper and lower faces of the extruded strip. For this purpose, the die 14 has its entrance opening 15 of generally rectangular configuration, as shown in FIG. 2, with the dimensions thereof unequal and the greater dimension preferably several times that of the lesser. The exit opening 16 of the die 14 likewise is of rectangular configuration with the dimensions thereof in reverse ratio to those of the inlet or entrance opening 15. That is to say, if the greater dimension of the entrance opening be considered its height in FIG. 2, then the greater dimension of the exit opening is at right angles thereto and is the width of that opening. Conversely, the lesser dimension or width of the entrance opening corresponds to the height of the exit opening. These entrance and exit openings of the die are connected by a smooth-wall material passageway through the die which has substantially the same area in every transverse section thereof as the area of the entrance and exit openings. It will be understood that, although the die 14 is here shown as of one-piece construction, this is for the purpose of simplicity of illustration. The die may be formed of several separate parts which are removably rigidly secured together in a manner conventionally employed for extrusion dies.

The effect of employing a die, such as is shown in FIGS. 2–5, with the extrusion apparatus 10, when the material is of the nature mentioned above, is to form the substance into a rectangular cross section having a thickness several times the final thickness of the material and then progressively flatten and widen the strip of material as it moves through the die. Since the substance uniting the particles is elastomeric in nature, it permits relative movement of the plate-like particles. Hence, the constricting action of the die causes any of the plate-like particles which have their planes tilted relative to the vertical to be progressively swung around until their planes are horizontal with the result that the majority of the particles issuing from the exit end of the die will have their planes substantially parallel with each other and with the upper and lower faces of the material. The preferred direction of magnetization of the particles is at right angles to the planes of their plate-like surfaces and hence subjecting the strip issuing from the die to a magnetic field extending at right angles to the upper and lower faces of the material will produce a permanent magnet. The strength of this magnet is enhanced with respect to the strength of a magnet of similar substance and like cross section that has been extruded through a conventional die since the magnetic particles in the latter will have the planes of their surfaces disposed at a plurality of different angles to the faces of the strip in a more or less haphazard distribution.

The orientation of the particles, and hence the strength of the resulting magnet, can be further increased by passing the material issuing from the novel die through one or more pairs of cooperating rolls which reduce the thickness of the material without building a bank of the material in front of the rolls. This latter operation may be performed while the strip is either hot or cold and hence may be effected as the strip issues from the die or at a convenient subsequent time. The action of the rolls is considered to force the plate-like particles more completely into parallelism with the opposed faces of the strip thereby completing the orientation begun in the die. In addition, the plate-like particles are forced closer together which act in conjunction with the orientation to increase the magnetic strength of the strip.

The apparatus shown in FIG. 1 comprises one pair of cooperating rolls 17 acting upon the material as it issues from the novel extruder die. It will be apparent, however, that more than one pair of such rolls may be employed if desired. It will also be apparent that if the final thickness of the strip issuing from the rolls is less than that desired in the completed magnet, two or more strips may be laminated together by passage through cooperating rolls with or without use of a suitable solvent or adhesive.

The strip material as it issues from the rolls may pass immediately through a suitable apparatus 18 for magnetizing the strip in a direction extending at right angles to the faces thereof, this operation being effected preferably while the strip is momentarily stationary without, however, stopping production of the strip. To achieve this, the magnetization apparatus 18 is preferably one capable of providing the required field in a fraction of a second such as a condenser discharge type apparatus which is commercially available and hence need not be described in detail. The magnetization need not be effected immediately after the material is formed but can be achieved at any convenient time thereafter by subjecting the material to a suitable field of force.

The momentary arrest of progress of the strip during the magnetization operation can be effected by any desired expedient without interfering with the continuous production of the material from the extruder and passage through the rolls. Thus, sufficient spaces may be provided between the rolls 17 aid the magnetizing apparatus 18 so that a loop of the material can be formed during the momentary stopping of the passage of the material through the magnetizer with the travel of the material through the magnetizer being effected by suitable drive rolls the rotation of which is controlled by operation of the magnetizer in any desired manner.

Figure 6:
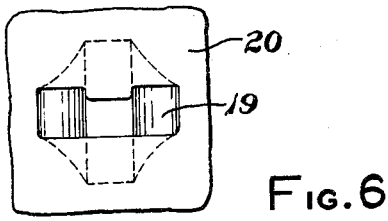
FIG. 6 is a view similar to FIG. 5 but showing a die with a modified exit opening.

It is not essential to the practice of this invention that the shape of the exit opening in the extrusion die be a simple rectangle in configuration. Thus, it may have a configuration which is somewhat in the form of a flattened U, as designated 19 for the die 20 shown in FIG. 6, or may have other generally rectangular configurations as may be dictated by the desired shape of the completed magnet. Alternatively, the exit opening of the novel die need not be shaped to provide the exact final configuration of the extruded material. Instead, a suitable shaping plate or rolls may be positioned adjacent to the outer face of the extrusion die 14 to form the material into the desired cross section as it issues from the extruder, it being remembered that the binder for the material is in plastic condition as it issues from the extruder and hence may be readily shaped by appropriate means.

The invention has been described as it is employed in preparing an elongated flexible magnet of barium ferrite platelets united by plasticized polyvinyl chloride. As noted above, however, the invention is not limited to use of these materials. Furthermore, it is not necessary in all cases that the extrusion of the material through the novel die be followed immediately by further reduction in thickness through the use of cooperating rolls. The combination of the treatment by the die and the cooperating rolls is, however, the presently preferred embodiment. It will be evident, furthermore, that, in place of employing rolls for increasing the amount of orientation, this increased orientation may be achieved by increasing the length of the die so that the particles have a longer travel therethrough to effect turning thereof to the desired orientation. Alternatively with respect to the use of rolls, it is also possible to employ pressure means such as presses or equivalent known expedients. These and other modifications and adaptations of the invention, which will be readily apparent to those skilled in the art, are considered as coming within the ambit of the invention, the scope of which is defined in the appended claims.

Having thus described the invention, I claim:

1. An extrusion die for effecting orientation into generally parallel relationship of plate-like particles united by plastic elastomeric material, the said die comprising a rigid body with a material passageway therethrough of substantially the same area in every transverse section thereof and with the entrance and exit openings to the passageway having unequal major and minor transverse dimensions with the major dimension of the exit opening disposed at right angles relative to the major dimension of the entrance opening.

2. An extrusion die for orienting into generally parallel relationship plate-like particles united by a plastic elastomeric material, the said die comprising a rigid body with generally rectangular entrance and exit openings, the dimensions of said openings being greater in one direction than in the other direction with the greater and lesser dimensions of the exit opening oppositely disposed as compared with the dimensions of the entrance opening, the said entrance and exit openings being interconnected by a passageway of substantially uniform transverse cross-sectional area throughout the die.

3. An extrusion die for orienting into generally parallel relationship plate-like particles united by a plastic elastomeric material, the said die comprising a rigid body with generally rectangular entrance and exit openings, one dimension of said entrance opening being several times that of its other dimension, the dimensions of said exit opening being in reverse ratio to the dimensions of the entrance opening, and a smooth-wall passageway through said die interconnecting said entrance and exit openings with the area of the entrance and exit openings and every transverse cross section of said passageway substantially equal.

4. In the method of producing magnetically anisotropic elongated permanent magnets the steps comprising providing finely-divided plate-like particles of magnetizable material united by a plastic elastomeric material, forming the elastomeric material with the particles therein into a compact body of generally rectangular cross section with a greater dimension in one transverse direction than at right angles thereto, and altering the cross-sectional shape of said body by reducing the greater transverse dimension thereof through application of pressure thereon while permitting increase in the lesser dimension of the body and while maintaining the cross-sectional area of the body substantially constant thereby causing said plate-like particles to take up positions in said body such that the planes of the particles are generally parallel to those faces of the body having the greater transverse dimension after said alteration of the cross-sectional shape of the body.

5. The method of producing magnetically anisotropic elongated permanent magnets comprising providing finely-divided plate-like particles of magnetizable material united by a plastic elastomeric material, forming the elastomeric material with the particles therein into a compact body of generally rectangular cross section with one transverse dimension several times larger than the other transverse dimension, progressively reducing the said one transverse dimension of said body and simultaneously increasing the said other transverse dimension while maintaining the cross-sectional area of the body substantially constant, and thereafter magnetizing the material.

6. The method as defined in claim 5 wherein the direction of magnetization is perpendicular to the surfaces of the material having the greater transverse dimension.

7. The method of producing magnetically anisotropic elongated permanent magnets comprising providing finely-divided plate-like particles of magnetizable material united by a plastic elastomeric material which particles have a preferred direction of magnetization extending perpendicularly to the planes thereof, extruding the elastomer with the particles therein through a die which first forms the material into a cross section with a greater dimension in one direction than at right angles thereto and then progressively reduces the originally greater dimension while increasing the originally lesser dimension until these dimensions have been interchanged, and thereafter subjecting the extruded material to a magnetizing field extending generally perpendicular to the surfaces of the material having the greater transverse dimension.

8. The method of producing magnetically anisotropic elongated permanent magnets comprising providing finely-divided plate-like particles of magnetizable material united by a plastic elastomeric material which particles have a preferred direction of magnetization extending perpendicular to the planes thereof, extruding the elastomer with the particles therein through a die which first forms the material into a generally rectangular cross section with a greater dimension in one direction that at right angles thereton and then progressively reduces the originally greater dimension while increasing the originally lesser dimension until these dimensions have been interchanged, further reducing the now lesser dimension of the extruded material by exerting pressure upon the opposite faces of the extruded material in the direction of its lesser dimension, and thereafter subjecting the material to a magnetizing field extending generally perpendicular to the opposed faces of the material.

9. The method of producing magnetically anisotropic elongated permanent magnets comprising providing finely-divided ferromagnetic material of a composite oxide of iron and at least one of the metals selected from the group consisting of barium, strontium and lead, incorporating the said oxide in a plastic elastomer, extruding the elastomer with the oxide therein into an elongated strip of generally rectangular cross section with a greater dimension in one direction than at right angles thereto, progressively reducing the originally greater dimension of the strip while increasing the originally lesser dimension thereof until these dimensions have been interchanged, and thereafter magnetizing the extruded material along the preferred axes of magnetization of the said particles.

10. The method of producing magnetically anisotropic elongated permanent magnets comprising providing finely-divided ferromagnetic platelets of a composite oxide of iron and at least one of the metals selected from the group consisting of barium, strontium and lead, incorporating the said oxide platelets in a plastic elastomer, extruding the elastomer with the oxide platelets therein through a die which first forms the material into a generally rectangular cross section with a greater dimension in one direction than at right angles thereto and then progressively reduces the originally greater dimension while increasing the originally lesser dimension until these dimensions have been interchanged, further reducing the lesser dimension of the extruded material, and thereafter magnetizing the material in a direction perpendicular to the surfaces of the material having the greater dimension.

References Cited in the file of this patent

UNITED STATES PATENTS

| | | |
|---|---|---|
| 1,669,665 | Karcher | May 15, 1928 |
| 2,168,288 | Fischer | Aug. 1, 1939 |
| 2,199,526 | McCowen | May 7, 1940 |
| 2,572,677 | Tench | Oct. 23, 1951 |
| 2,849,312 | Peterman | Aug. 26, 1958 |